United States Patent
Lin et al.

(10) Patent No.: US 7,396,519 B2
(45) Date of Patent: Jul. 8, 2008

(54) PREPARATION OF A HIGH PURITY AND HIGH CONCENTRATION HYDROXYLAMINE FREE BASE

(75) Inventors: Kaung-Far Lin, Tainan (TW); Jin-Fu Chen, Lucao Township, Chiayi County (TW); Wei Te Lin, Youngkang (TW); Ruey-Shing Chen, Tainan (TW); Kung-Chin Kuo, Youngkang (TW)

(73) Assignee: San Fu Chemical Company, Ltd., Taipei (TW)

( * ) Notice: Subject to any disclaimer, the term of this patent is extended or adjusted under 35 U.S.C. 154(b) by 1014 days.

(21) Appl. No.: 10/764,681

(22) Filed: Jan. 26, 2004

(65) Prior Publication Data

US 2005/0163694 A1    Jul. 28, 2005

(51) Int. Cl.
*C01B 21/00*    (2006.01)

(52) U.S. Cl. .............................. 423/387; 203/6; 203/12

(58) Field of Classification Search ................. 423/387; 203/6, 12

See application file for complete search history.

(56) References Cited

U.S. PATENT DOCUMENTS

| | | | |
|---|---|---|---|
| 4,778,669 A | * | 10/1988 | Fuchs et al. ............... 423/387 |
| 4,956,168 A | | 9/1990 | Wagaman |
| 5,472,679 A | | 12/1995 | Levinthal et al. |
| 6,299,734 B1 | | 10/2001 | Watzenberger et al. |

FOREIGN PATENT DOCUMENTS

| | | |
|---|---|---|
| DE | 3528463 A1 | 2/1987 |
| WO | WO-97/22551 | 6/1997 |

* cited by examiner

*Primary Examiner*—Peter O'Sullivan
(74) *Attorney, Agent, or Firm*—The SUN Law Office; Hsiang-ning Sun

(57) ABSTRACT

A high purity aqueous solution of hydroxylamine product is prepared by treating an aqueous solution of hydroxylammonium salt with a base like ammonia at low temperatures. A novel process can be carried out by separating the ammonium salt side product from hydroxylamine with a low temperature filtration and a resin-exchange process. The concentration of the hydroxylamine product is further improved by a safe distillation process that produces a high purity and high concentration hydroxylamine product with reduced risks of explosion.

31 Claims, 4 Drawing Sheets

Reactor temperature profiles during neutralization described in Example 5 pH profiles during the neutralization described in Example 5

Reactor temperature profiles during the neutralization described in Example 6 pH profiles during the neutralization described in Example 6.

PREPARATION OF A HIGH PURITY AND HIGH CONCENTRATION HYDROXYLAMINE FREE BASE

BACKGROUND OF THE INVENTION

The present invention relates to a process for the manufacture of a high purity and high concentration aqueous solutions of hydroxylamine. Hydroxylamine free base (hereinafter $H_2NOH$, HA or HAFB) is a specialty chemical widely used in the pharmaceutical, agricultural chemical and electronic industries. Potential applications of HA-related chemicals are also possible in automotive, aerospace industries and as an oxidant for various formulations in liquid propellants.

Since its introduction by Nissin Chemical Co., Ltd. of Japan in the early 1970, the commercial product has been shipped as a 50% aqueous solution for more than 30 years now. The rapid growth of the use of HA in the semiconductor industry accounts for the increase of the market demand in the recent years. A double-digit growth in 2003 has been projected by a marketing study. In addition, a successful commercialization of the HA-related liquid propellants for air bags and a monopropellant thruster will, for sure, increases the demand in the market further.

There are three basic manufacturing technologies that have been disclosed in the patent literature:
Reaction of a base with a hydroxylamine salt (neutralization process);
Ion-exchange process;
Electrochemical process.

In the neutralization process, once the free base is liberated, the process involves additional steps to achieve a 50% concentration product and with extremely high purity. These additional process steps include:
Separation and removal of side products;
Concentration of the hydroxylamine to a desired concentration level; and
Purification of the product to a purity required for the intended applications.

Depending on the applications in different industries, the desired and sometimes required metal impurity levels, especially those of transition metals such as iron, cobalt, chromium, can vary from hundreds of ppm to several ppb. Furthermore, the stability of a hydroxylamine product depends on temperature, hydroxylamine concentration, metal impurity levels and other factors. Therefore, the concentration and purification process chosen for producing the desired product specification is extremely critical.

Many attempts have been disclosed by various inventors for the preparation of hydroxylamine using hydroxylamine salts with various bases.

For example, DE-A-3528463 discloses the neutralization with calcium, strontium, or barium hydroxide. The removal of finely divided alkaline earth metal sulfate side products presents considerable difficulties. In addition, calcium sulfate side product has a relatively high solubility, thus it cannot be totally removed by filtration. Strontium hydroxide and barium hydroxide are highly priced and known to be quite toxic.

U.S. Pat. No. 5,472,679 describes a process for the preparation of hydroxylamine by reacting a hydroxylamine sulfate (HAS) solution with a suitable base at up to 60° C. The resulting mixture is distilled to dryness under reduced pressure at <65° C. During the distillation, the metal impurity concentration increases along with the HA concentration, thus risking the danger of explosion.

U.S. Pat. No. 4,956,168, DE-A-1247282, and EP-A-108294 disclose a process in which alcoholic solutions of free hydroxylamine are obtained by reacting hydroxylammonium sulfate with ammonia in an alcohol solvent followed by removing the precipitated ammonium sulfate side product. However, owing to the flammability of the alcohol solutions and the high expense in recovery of the alcohol solvents, this process is difficult to be commercialized at a large scale.

DE-A-3601803 describes the use of lower alcohol solvents. The precipitated ammonium sulfate side product is separated, water is added and the alcohol is distilled off from the solution. Again, the flammability of the lower alcohol solvents and the instability of the hydroxylamine prohibit the industrial application of the process.

WO97/22551 discloses a process by which a solution, resulting from neutralization of HAS with a suitable base, is separated into an aqueous hydroxylamine fraction and a salt solution by distillation at a temperature above 80° C. (stripping). The HA fraction is further concentrated in a distillation column. With a strong base such as sodium hydroxide, a complete neutralization is obtained. However, the ready decomposition of HA, its sensitizing effect, and the tendency of sodium sulfate to cake make the process difficult to practice industrially.

The use of aqueous ammonium hydroxide as a base would have two major advantages over sodium hydroxide: i) lower cost, and ii) no metal contamination. However, ammonium hydroxide is a relatively weak base, only 60-70% conversion is observed under the above stripping procedure. Therefore, the use of ammonium hydroxide is not viable with the stripping method of WO 97/22551.

U.S. Pat. No. 6,299,734 B1 discloses a process by which the hydroxylammonium salt in an aqueous phase is treated with ammonia by a countercurrent method and at the same time the solution obtained is separated into an aqueous hydroxylamine solution and a salt fraction by stripping with steam in a stripping/reaction column. In a particularly preferred embodiment, the neutralization of hydroxylamine salt with ammonia is carried out by the countercurrent method and the stripping of the hydroxylamine from the salt solution is effected in combination with partial concentration of the hydroxylamine solution in only one column, i.e. a stripping/reaction/distillation column. The process improves over the simple stripping process by increasing the yield of hydroxylamine from about 60% to 90%. However, the stripping/reaction/distillation process employs substantial amount of steam. Not only the energy cost on the steam used is high, additional energy is also required to concentrate the hydroxylamine product because of low hydroxylamine concentrations produced from the process to avoid the hydroxylamine decomposition when exposed to >80° C. temperature during the manufacturing process.

SUMMARY OF THE INVENTION

The instant invention is related to a process for preparing a high purity and high concentration hydroxylamine free base product. The process comprises a.) feeding an aqueous feed solution containing a hydroxylammonium salt at a maximum concentration and a small amount of a stabilizer into a reactor at a low temperature; b.) neutralizing the aqueous feed solution with a base to form a slurry until the pH of the resulting slurry reaches 9.0 to 12.0; c.) adding an additional amount of a solid of the hydroxylammonium salt to increase the total amount of the hydroxylammonium salt in the reactor before or during neutralization; d.) separating the resulting slurry into an aqueous solution phase and a solid phase at a temperature between −20 to 20° C.; e.) treating the aqueous solution phase in at least one an ion exchange column containing at least one ion exchange resin to produce a high purity hydroxylamine solution thereby the resistivity is not lower than about 10 Megohms-cm; and f.) concentrating the high purity hydroxylamine solution at a sub-atmospheric pressure to form the high purity and high concentration hydroxylamine product.

It is another aspect of the instant invention relates to a process for preparing a high purity and high concentration hydroxylamine product, the process comprises: a.) feeding an aqueous feed solution containing a hydroxylammonium salt consisting essentially of hydroxylammonium sulfate (also referred to as hydroxylamine sulfate) at a maximum concentration and a stabilizer consisting essentially of cyclohexanediaminetetraacetic acid into a reactor at a low temperature; b.) neutralizing the aqueous feed solution at a temperature in the range of from about 15 to 45° C. with ammonia gas to form a slurry until the pH of the resulting slurry reaches 9.0 to 12.0; c.) adding an additional amount of solid of hydroxylammonium sulfate wherein the ratio of the additional amount of solid added to the amount of hydroxylammonium sulfate in the aqueous feeding solution is in the range of from 0.6 to 4.5 on a weight to weight basis to increase the total amount of hydroxylammonium sulfate in the reactor before or during neutralization; d.) separating the resulting slurry by centrifugation and filtration into an aqueous solution phase and a solid phase at a temperature between about 5 to about 15° C.; e.) treating the aqueous solution phase in a first column containing anion exchange resin to form an effluent followed by treating the effluent in a second column containing a cation exchange resin to produce a high purity hydroxylamine solution thereby the resistivity is in the range of from about 10 Megohms-cm to about 50 Megohms-cm; and f.) concentrating the high purity hydroxylamine solution at a sub-atmospheric pressure in the range of from about 10 torrs to about 60 torrs [about 1.33 kPa to about 8.0 kPa] and a temperature in the range of from about 30° C. to about 40° C. to form the high purity and high concentration hydroxylamine product.

It is a further object that the ion exchange step is carried out in two to four stages:

A. feeding the aqueous solution phase into a first column containing the anion exchange resin until breakthrough of salt anions in the effluent;

B. (optional) regenerating the anion exchange resin with sulfuric acid to form a sulfate form followed by converting the sulfate form into an hydroxide form;

C. feeding the effluent from stage A into a second column containing the cation exchange resin until breakthrough of ammonium ion; and D. (optional) regenerating the cation exchange resin with sulfuric acid.

It is yet another aspect of the present invention that the process is carried out in a fixed bed, continuous moving bed, or simulated moving bed ion exchange apparatus.

DESCRIPTION OF THE INVENTION

Figure 1:
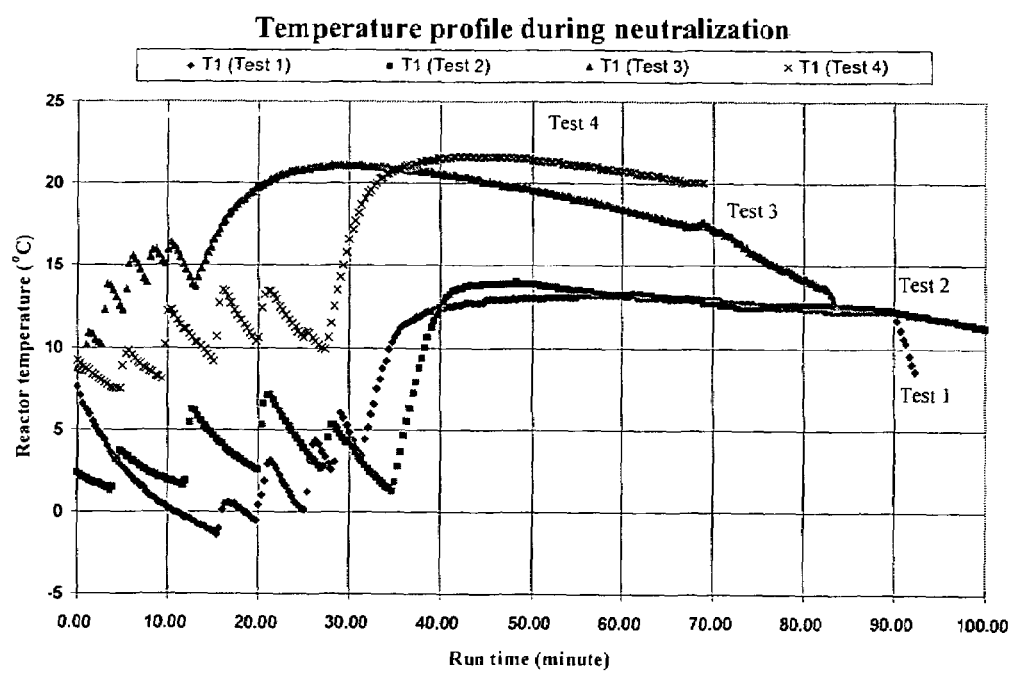
FIG. 1 shows temperature profiles of four separate tests in Example 5 during which an aqueous solution hydroxylammonium salt is neutralized with a base. The reactor temperature is recorded as a function of time.

It is one object of the present invention to provide a new, innovative, economical and safe process for the production of a high purity and high concentration hydroxylamine free base which can be carried out utilizing strong bases such as sodium hydroxide, potassium hydroxide, or weak bases such as ammonia, preferably in the gaseous form, volatile alkylamines, cyclic amines and mixtures thereof, for the complete liberation of hydroxylamine from its salt.

We have unexpectedly discovered that the object can be achieved by neutralizing hydroxylammonium salt with ammonia gas at a low temperature to obtain high yields with high hydroxylamine concentrations. The ammonium salt side product (also referred to as byproduct) can be separated from the free base again at low temperatures by a combination of filtration and ion-exchange, thus avoiding the reversible reaction that typically occurs quickly at high temperatures. Being of high purity and relatively high concentration after these steps, the hydroxylamine can be further distilled under vacuum at a relatively low temperature to obtain a desired high concentration at the bottom with minimum decomposition and reduced risks of explosions.

This invention relates to a process for an economic production of high purity and high concentration hydroxylamine by neutralizing a hydroxylammonium salt with ammonia gas to its completion and removing the reaction side product at low temperatures to prevent the reversible reaction thus achieving high product yield. In addition, due to the high purity nature of the product generated by the present process, any subsequent concentration step can be performed rather safely.

The present process comprises several steps: neutralization of hydroxylammonium salt with a base, preferably a weak base such as ammonia; separation of the ammonium salt side product at low temperatures; and concentration of the highly pure hydroxylamine.

Neutralization

It is well known that the treatment of a hydroxylammonium salt with a base will liberate hydroxylamine free base. The hydroxylammonium salts used are generally the salts of mineral acids in the aqueous solution. These acids include sulfuric acid, hydrochloric acid, nitric acid and phosphoric acid. A preferred hydroxylammonium salt is or consists essentially of hydroxylammonium sulfate.

Both strong bases and weak bases can be used for the present invention. Strong bases include, but are not limited to, sodium hydroxide, potassium hydroxide, rubidium hydroxide, cesium hydroxide, and mixtures thereof. Weak bases include, but are not limited to, ammonium hydroxide, ammonia (liquid and gas forms, or mixtures), volatile bases such as alkylamines (C1-C6 amines such as methylamine, ethylamine, dimethylamine, etc.), and cyclic amines such as cyclohexylamine and their mixtures. Ammonia gas is a preferred weak base for ease of operation and other chemical and physical properties. Liquid ammonia also may be used under certain conditions to control the exothermicity of the neutralization reaction in the neutralization reactor.

By using strong bases such as sodium hydroxide or potassium hydroxide, hydroxylamine can be completely liberated from its hydroxylammonium salt. A weaker base such as ammonium hydroxide and other volatile bases including alkylamines and cyclic amines could not displace hydroxylamine completely due to the neutralization equilibrium:

(H₃NOH)₂X+2 ROH=R₂X+2 H₂NOH+2 H₂O     (1)

In this equation, X is an example of a dibasic acid anion such as sulfate, $SO_4^=$, derived from sulfuric acid; and R is $NH_4^+$.

For using ammonium hydroxide as the base and hydroxylamine sulfate as the neutralization feed, the solubility of ammonium sulfate in water at 100° C. is relatively high, 51% by weight. This solubility decreases as the temperature decreases. This will lower the driving force from reversing the neutralization to the left of equation 1.

If ammonia gas is used as the weak base for neutralization and X is again an example of a dibasic acid anion such as sulfate, $SO_4^=$, then the reaction is represented by equation (2) as shown below:

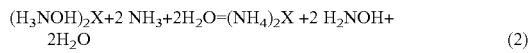
(H₃NOH)₂X+2 NH₃+2H₂O=(NH₄)₂X +2 H₂NOH+ 2H₂O     (2)

For the present invention, the neutralization step is conducted at a temperature in the range of from about −25° C. to about 25° C., preferably from about −20° C. to about 10C. The heat of neutralization may raise the temperature of the reactor and its contents to <30° C. before it is lowered to the initial temperature.

The hydroxylamine sulfate or other similar feed solutions are typically introduced into the neutralization reactor at a low temperature, which is in the range of from about −25° C. to about 25° C., preferably from about −20° C. to about 10° C. This low temperature is often and preferably selected to be close to or the same as the initial neutralization temperature.

The concentration of the hydroxylamine produced from the neutralization reaction depends not only on the yield of the process but on the amount of water brought to the reactor. In the present invention, it is preferred that the hydroxylammonium salt and the base of the highest or maximum possible concentrations under the reaction condition are used. For example a 25-33% by weight of hydroxylammonium sulfate solution in water is used initially, representing the saturation concentrations of HAS in water at a particular neutralization temperature and other reaction conditions. Also preferably, ammonia gas instead of ammonium hydroxide solution is introduced into the neutralization reactor.

Before or while the neutralization is in progress, it is advantageous that an additional amount of hydroxylamine sulfate, or any other hydroxylammonium salt selected as the starting material for the process, preferably in the form of solids or crystals or powders, are added to increase the HA product concentration. The ratio of this additional amount of the solid added to the amount of hydroxylammonium sulfate in the aqueous feeding solution is in the range of from about 0 to about 4.8, preferably from about 0.5 to about 4.6, and more preferably from about 0.6 to about 4.5, all on a weight to weight basis.

It is also preferred that an excess amount of the weak base is added to drive the equilibrium to the right of Equation 1. As an example, using hydroxylammonium sulfate and ammonia, an excess amount of ammonia at 10 to 30% by weight in the final product solution over the total amount of ammonia needed to neutralize hydroxylammonium sulfate—including any additional amount of hydroxylammonium sulfate solid or crystal added—in the product solution is used to ensure a complete neutralization at a temperature in the range of from about 0C. to about 10° C.

Alternatively, another preferred method for the neutralization is the addition of hydroxylammonium salt crystal to the water solution of a base. In the case of ammonium hydroxide and hydroxylammonium sulfate, the aqueous solution of ammonium hydroxide with an ammonia content of ranging from 18 to 29 weight percents is first added to the reactor and then hydroxylammonium sulfate in the form of crystal or powder is then added in one total sum or in separate sequential amount to match the amount of ammonium hydroxide in the basic solution. As the neutralization progresses, the pH of the solution will decrease. As the neutralization is completed, typically at a pH of between about 8 and about 9, ammonia is added to the product solution until the pH is at between about 12 and about 12.5.

Stabilizer(s), typically chelating agents that are capable of binding metal ions in the pH range of the aqueous hydroxylamine solution and by themselves are anions, are preferably added before the neutralization step. A preferred mode is to have at least one stabilizer in the aqueous feed solution containing the hydroxylammonium salt.

Examples of suitable stabilizers include, but are not limited to hydroxyanthraquinone, substituted hydroxyanthraquinones, thiourea, substituted thioureas, hydroxyurea, substituted hydroxyureas, aminoquinoline, substituted aminoquinolines, phenanthroline, substituted phenanthrolines, one or more polyhydroxyphenols, cyclohexanediaminetetraacetic acid, thiamine or its derivatives, ethylenediaminetetraacetic acid or its derivatives, other chemically similar compounds, and mixtures thereof. A preferred stabilizer is cyclohexanediaminetetraacetic acid.

The concentration of the stabilizer is typically from about 20 to about 50,000 ppm by weight. Preferably, it is from about 50 to about 5,000 ppm by weight. Most preferably, it is from about 100 to about 500 ppm by weight.

The neutralization step can be carried out in a number of known reactor systems or configurations. For example, the reactor can be a conventional vessel, counter-current reactor, co-current reactor or any other types known to those skilled in the art. If ammonia gas is used as the weak base, it can be distributed into the reactor via any known gas distribution methods such as sparging. Additional mixing can be achieved by using many known methods such as agitation with moving/rotating baffles, stirring, blending, or through fixed parts designed into the reactor itself. Because the neutralization reaction is exothermic, it is preferred to incorporate such additional mixing mechanism into the reactor system to have better and more even temperature distribution and control. The temperature change in this step is generally controlled within a range of from about 0 to about 35° C., preferably from about 0 to about 25° C., more preferably from about 5 to about 20° C. If a base such as ammonia is introduced into the system at a temperature lower than the temperature of the solution containing the hydroxylammonium salt, there could be a temperature drop initially.

The side product, ammonium salt such as ammonium sulfate, typically has limited solubility in the neutralization product mixture, particularly at low temperatures. As a result, the neutralization step typically produces a slurry product with a solid phase and an aqueous solution (liquid) phase. It is preferred that at the end of the neutralization step the pH of the slurry is in the range of from at least 7.0 to about 14, preferably from about 8 to 13, and more preferably from about 9 to about 13. It is preferred that hydroxylammonium sulfate is used as the hydroxylammonium salt and an HA solution of greater than (>) 50% by weight can be prepared in one neutralization step after the removal of the excess ammonia (used as the base) and the ammonium sulfate dissolved in the solution (see Example 6).

Filtration

The precipitated ammonium salt (solid phase) in the slurry is removed by centrifugation and/or filtration (such as vacuum filtration) at such low temperatures. Any conventional or known centrifugation and/or filtration methods can be used. Depending the solid content in the product slurry, solid particle size, pH and other factors, sometimes it is preferred to use both centrifugation and filtration to achieve maximum solid salt removal.

A preferred low temperature range for carrying out the filtration is in the range of from about −20° C. to about 10° C. A more preferred temperature range is from about −5° C. to about 5° C. Under this solid-liquid separation, majority of the ammonium sulfate precipitate is removed. A solution containing at least 50% (by weight) of HA scan be preferably produced and/or recovered after the neutralization step is carried out and after the removal of the excess base (such as ammonia) and the dissolved side product salt such as ammonium sulfate. (see Example 6) However, even at these low temperatures, an ammonium salt like ammonium sulfate still maintains certain solubility in the liquid aqueous solution phase of the hydroxylamine product slurry. For the present invention, it is preferred that this residual salt still dissolved in the aqueous solution phase is removed by ion-exchange in a reactor or column containing at least one anion-exchange resin to achieve the desired high purity of the hydroxylamine product.

Ion-exchange

The second step of the separation of ammonium sulfate from the aqueous solution of hydroxylamine is by an ion-exchange process. An anion-exchange resin in the OH-form is used to remove sulfate ion or other anions from the aqueous solution. Suitable resins include, but are not limited to, macroporous anion exchange resins, strong basic gel resins, and mixtures thereof. Many commercial anion exchange resins that are capable of exchanging sulfate (or nitrate, chloride, phosphate etc) with $OH^-$ ion are adequate for the removal of sulfate ion and other similar anions. As examples, Rohm and Haas Amberjet® 4400, Sybron Ionac® ASB-1, and Mitsubishi SAT 10L and SAT 20L are particularly effective exchange resins for the removal of sulfate ions. All the trademarks of such commercially available ion exchange resins belong to their respective owners.

This anion ion-exchange step of the present invention can be carried out in a fixed bed, continuous moving bed or simulated moving bed ion exchange apparatus/reactor. The treatment is continued until the anion appears in the outlet of the exchange bed. At this point, the anion ion exchange resin can be regenerated by treatment with a strong mineral acid such as sulfuric acid to form a suitable form such as a sulfate form. Following this, the anion resin is converted to the OH form by methods known to those skilled in the art. This regeneration can be carried out either "on line" as part of the entire process, or "off line" in an isolated reaction vessel. If an array of anion ion exchange resin columns (reactors) is present, each column can be switched on or off independently.

During the anion-exchange step, the pH of the aqueous solution is preferably maintained at equal to or greater than about 7.0 to enhance the equilibrium to the right side of Equations (1) or (2). A typical pH range is from about 7 to about 14. A preferred pH range is from about 8 to about 11. A more preferred pH range is from about 8.5 to about 10.

Because the aqueous hydroxylamine solution also contains ammonium and metal ions, it is desirable to remove these ions, particularly transition metal ions such as iron, cobalt, and others. One optional additional step is to treat the aqueous solution with one or more cation ion exchange resions. This treatment can be performed before or after the anion exchange resin treatment. It is preferred that this cation exchange resin treatment is carried out after the anion exchange resin treatment. Suitable resins include, but are not limited to, macroporous cation exchange resins, strong acid gel resins, and mixtures thereof Commercially available cation exchange resins suitable for this purpose include, but are not limited to, Rohm and Haas Amberjet® 1500, IONAC® CPF-110, Dowex® HGR-W2, and Mitsubishi SKT 10L and SKT 20L. A preferred resin is Mitsubishi SKT 20L. All the trademarks of such commercially available ion exchange resins belong to their respective owners.

This cation ion-exchange step of the present invention can be carried out in a fixed bed, continuous moving bed or simulated moving bed ion exchange apparatus/reactor. The treatment is continued until the ammonium cation or metal ion is observed in the effluent. At this point, the cation ion exchange resin can be regenerated by treatment with a strong mineral acid such as sulfuric acid. This regeneration can also be carried out either "on line" as part of the entire process, or "off line" in an isolated reaction vessel. If an array of cation ion exchange resin columns (reactors) is present, each column can be switched on or off independently.

One preferred criterion to measure the high purity of the ion-exchanged product is the resistivity of the resultant aqueous hydroxylamine solution. The higher the resistivity is, the higher the purity of the HA containing solution. For the present invention, the resistivity of a high purity hydroxylamine solution after ion-exchange is not lower than about 75 Megohms-cm, preferably not lower than about 50 Megohms-cm, more preferably in the range of from about 10 Megohms-cm to about 50 Megohms-cm. This resistivity measurement can be carried out by many methods or instrument known to those skilled in the art.

Concentration

The aqueous solution obtained from the filtration, anion-exchange and optional cation-exchange steps is essentially free from metal and anion impurities, i.e. the resistivity is not lower than those prescribed levels disclosed above. As well known to those skilled in the art, resistivity is in inverse relationship with conductivity. Furthermore, the hydroxylamine concentration in the aqueous solution before the concentrations step is typically in the range of from about 15 to about 55% by weight, preferably from about 20 to about 50% by weight, and more preferably from about 30 to about 50% by weight.

Since the aqueous hydroxylamine solution is quite pure and it is essentially free of metal ions, especially it is substantially free [less than about 100 ppb] of transition metals, the concentration process can be performed with a simple distillation with a high degree of safety. As the distillation progresses the hydroxylamine concentration in the distillation bottom increases and so is the metal concentration. Therefore, it is desirable to distill under reduced (sub-atmospheric) pressure and lower temperature to minimize hydroxylamine decomposition. The temperature is typically from about 25° C. to about 60° C., preferably from about 30° C. to about 50° C., and more preferably from about 35° C. to about 40° C. A reduced (or sub-atmospheric) pressure is generally in the range of from about 6 torrs to about 100 torrs [about 0.8 kPa to about 13.3 kPa], preferably about 10 torrs to about 80 torrs [about 1.33 kPa to about 10.7 kPa], more preferably about 10 torrs to about 60 torrs [about 1.33 kPa to about 8.0 kPa].

The distillation can be conducted with any distillation columns or reactors or configurations that are known commercially or to those skilled in the art. The vacuum requirement and operational procedures/parameters are appropriately chosen to optimize the distillation efficiency and economics. The high concentration attainable after the concentration step is typically in the range of from about 35 wt % to about 55 wt %.

The following examples illustrate the principles and advantages of the present invention. Examples 1-3 are comparative examples showing the preparation of hydroxylamine free base from the neutralization of hydroxylamine sulfate with three bases, sodium hydroxide, potassium hydroxide and ammonia.

EXAMPLE 1 (COMPARATIVE)

To a 500-mL three-neck Pyrex® round-bottom flask, 291.54 grams of a 45.63% by weight potassium hydroxide were added. The reactor was cooled with a ice-water bath at 4° C. and the solution was stirred with a Teflon-coated stirrer. 194.45 grams of hydroxylamine sulfate (>99.0% purity) were added to the reactor gradually. Occasionally, the reactor was shaken manually to improve the mixing. All these operations were conducted in a Class 100 clean room. At the end of the neutralization, the product solution was centrifuged at 4000 rpm and the clear solution was decanted. The product was analyzed with an automatic titrator (Kyoto Electronics, Model AT-500).

Results of the analysis showed a potassium sulfate of 5.41% and a hydroxylamine concentration of 18.67% by weight.

EXAMPLE 2 (COMPARATIVE)

Following a general procedure of Example 1, 240.28 grams of a 50% sodium hydroxide solution were introduced into the 500-mL neutralization reactor. 226.45 grams of hydroxylamine sulfate (>99.0% purity) were added to the reactor gradually.

Results of the titration analysis on the clear product solution showed a sodium sulfate of 5.16% and a hydroxylamine concentration of 18.45% by weight.

EXAMPLE 3 (COMPARATIVE)

Following a general procedure of Example 1, 246 grams (200 mL) of a 33.0% hydroxylamine sulfate solution were introduced into the 500-mL reactor which was placed in clean bag. An electronic grade ammonia was fed into the reactor at a slow flow rate. The neutralization was terminated at a pH value of 9.0.

The product solution was filtered under vacuum with a Teflon® filter of 0.3 micrometer pore opening. The filtrate was analyzed with the automatic titrator.

Following the general procedure of Example 1, 300 milliliters (mL) of a 33.0% hydroxylamine sulfate solution were neutralized with ammonia gas in a 500-mL reactor. This was repeated with 800 mL of the 33.0% hydroxylamine sulfate solution in a 1000-mL reactor.

Several runs were conducted, results are summarized in Table 1 along with other neutralization runs.

TABLE 1

Results of analysis on products from Example 3

| Run number | Vol. of HAS (mL) | pH before filtration | HA before filtration (wt %) | PH after filtration | HA after filtration (wt %) |
|---|---|---|---|---|---|
| 1 | 200 | 9.48 | 12.15 | 9.48 | 13.50 |
| 2 | 200 | 9.73 | 12.63 | 9.83 | 12.85 |
| 3 | 300 | 9.17 | 12.17 | 8.89 | 12.25 |
| 4 | 300 | 9.25 | 12.47 | 9.25 | 13.14 |
| 5 | 800 | 9.50 | 11.73 | 9.25 | 12.09 |
| 6 | 800 | 9.22 | 11.28 | 9.36 | 12.56 |
| 7 | 800 | 9.09 | 11.87 | 8.85 | 12.50 |
| 8 | 800 | 9.17 | 11.64 | 9.20 | 12.08 |

EXAMPLE 4 (INVENTION)

Following a general procedure of Example 3, 200 milliliters (mL) of 33% HAS were neutralized with ammonia in a 500-mL reactor. Before the start of or during the addition of the base, about 150 grams of HAS crystal were also added to the reactor. After about 90 minutes, the reactor temperature was lowered to about 10° C. and the neutralization was completed. The reaction product was separated into two portions by a vacuum filtration: a filtrate and a filter cake.

The filter cake was dried in an oven at 105° C. for a period of more than 15 hours. The dried filter cake was dissolved in water and the contents of ammonium sulfate (AmS) and hydroxylammonium sulfate (HAS) were determined by titration. Reaction yields were calculated using analytical results obtained for HA, AmS and HAS as shown in Tables 2 and 3. Results of this example show that unexpectly a yield of much greater than 90% can be achieved by neutralizing hydroxylamine sulfate with a weak base such as ammonia and the solubility of the ammonium sulfate side product can be controlled to less than 6% in the hydroxylamine product solution after filtration.

TABLE 2

Results of analysis on products from Example 4

| Test # | 33% HAS (g) | HAS crystal (g) | $NH_3$ added (g) | Filtrate (g) | HA (wt %) | $NH_3$ (wt %) | HAS (wt %) | AmS (wt %) |
|---|---|---|---|---|---|---|---|---|
| 1 | 241.39 | 0 | 122.61 | 261.53 | 11.729 | 19.021 | 1.54 | 8.22 |
| 2 | 240.72 | 156.95 | 176.67 | 287.21 | 30.79 | 23.95 | 0.12 | 5.14 |
| 3 | 490.0 | 304.0 | 310.0 | 594.0 | 30.66 | 16.68 | 0.08 | 5.80 |
| 4 | 490.0 | 302.0 | 396.0 | 640.0 | 26.35 | 22.62 | 0 | 2.07 |

TABLE 3

Results of analysis on products from Example 4 (continued)

| Test# | Filter cake (g) | Dried filter cake (g) | HAS (g) | AmS (g) | Yield based on HA (%) | Yield based on AmS (%) | Yield based on HAS (%) |
|---|---|---|---|---|---|---|---|
| 1 | 70.46 | 55.30 | 0 | 55.07 | 95.69 | 119.38 | 94.94 |
| 2 | 246.97 | 199.84 | 2.49 | 173.32 | 92.95 | 98.84 | 98.81 |
| 3 | 426.0 | 333.57 | 10.36 | 334.26 | 97.17 | 94.86 | 97.67 |
| 4 | 442.0 | 353.00 | 9.70 | 355.30 | 90.95 | 98.73 | 97.91 |

EXAMPLE 5 (INVENTION)

Figure 2:
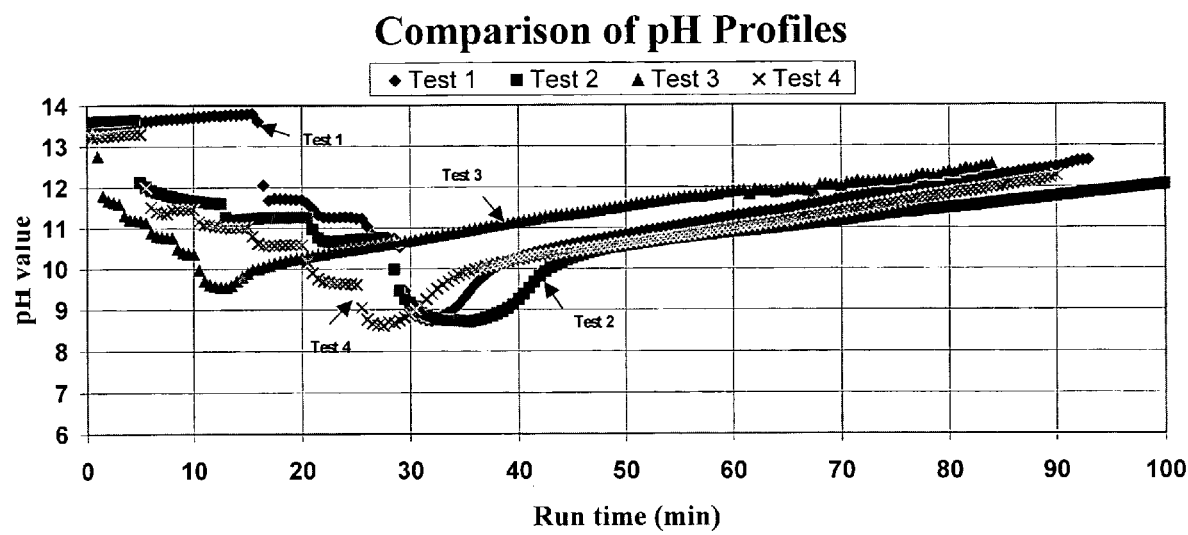
FIG. 2 shows the changes of pH values during the same tests.

397 grams of a base solution containing 18.6% of ammonia were introduced into a 1-liter jacketed reactor. After the reactor was cooled to 5.0° C., 461 grams total of hydroxylammonium sulfate were added to the reactor in five (5) steps. Both the reactor temperature and the pH of the neutralization solution were monitored as illustrated in FIGS. 1 and 2. As the pH decreased from about 13.3 to 9, ammonia was introduced to the reactor at a flow rate of 5 liters per minute until the pH of the product solution reached 12.5. The reaction product was separated into two portions by a vacuum filtration: a filtrate and a filter cake. The filtrate was analyzed for hydroxylamine, ammonia, hydroxylammonium sulfate and ammonium sulfate by a titration method.

The filter cake was dried in an oven at 105° C. for a period of more than 15 hours. The dried filter cake was dissolved in water and the contents of ammonium sulfate (AmS) and hydroxylammonium sulfate (HAS) were determined by titration. Reaction yields were calculated using analytical results obtained for HA, AmS and HAS as shown in Tables 4 and 5 for 4 repeat runs. Results of this example show that unexpectly a yield of 90% and higher can be achieved by neutralizing hydroxylamine sulfate with a weak base such as ammonia and the solubility of the ammonium sulfate side product can be controlled to less than 6% in the hydroxylamine product solution after filtration.

EXAMPLE 6 (INVENTION)

Figure 3:
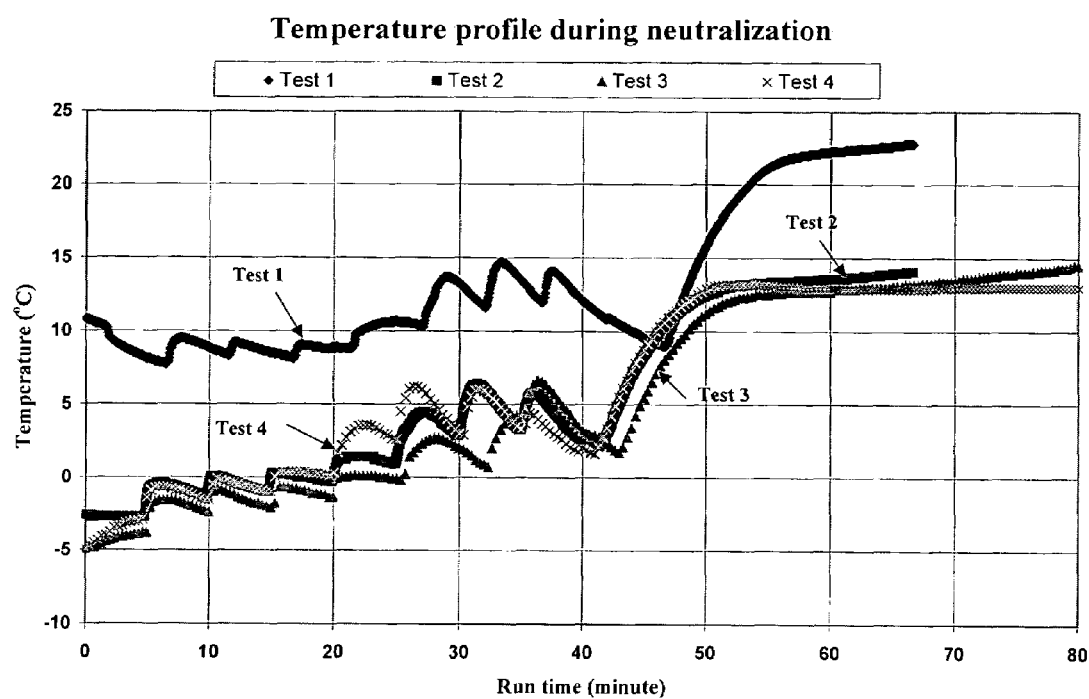
FIG. 3 shows temperature profiles of four separate tests in Example 6 during which an aqueous solution hydroxylammonium salt is neutralized with a base. The reactor temperature is recorded as a function of time.
Figure 4:
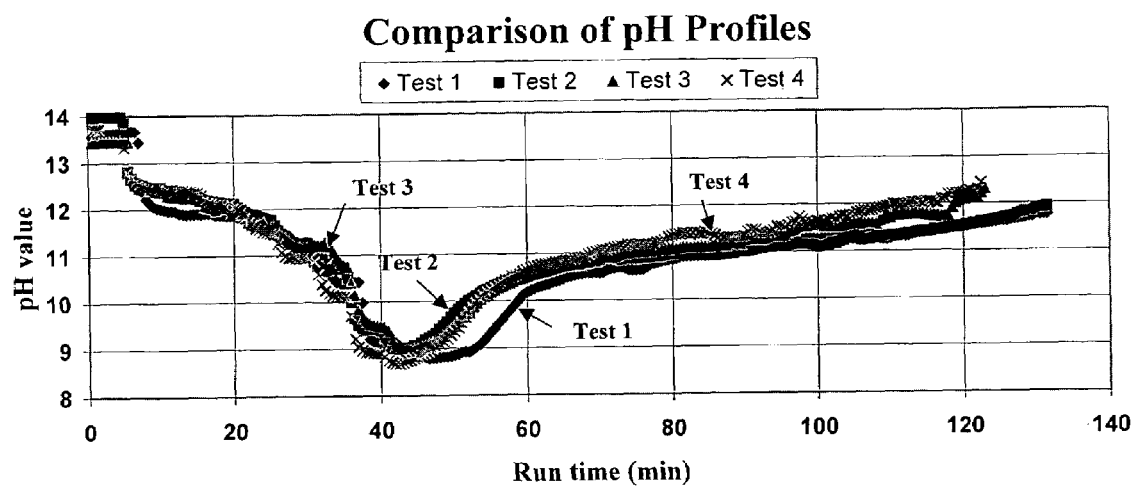
FIG. 4 shows the changes of pH values during the same tests.

Following a general procedure of Example 5, about 400 grams of an ammonium hydroxide solution containing 29.3% of ammonia were neutralizaed with about 750 grams of crystalline hydroxylammonium sulfate. The hydroxylammonium sulfate were added to the reactor in eight (8) steps (equal parts). Both the reactor temperature and the pH of the neutralization solution were monitored as illustrated in FIGS. 3 and 4. As the pH decreased from about 13.3 to 9, ammonia gas was introduced to the reactor at a flow rate of 5 liters per minute until the pH of the product solution reached 12.2. The reaction product was separated into two portions by a vacuum filtration: a filtrate and a filter cake. The filtrate was analyzed for hydroxylamine, ammonia, hydroxylammonium sulfate and ammonium sulfate by a titration method.

The filter cake was dried in an oven at 105° C. for a period of more than 15 hours. The dried filter cake was dissolved in water and the contents of ammonium sulfate (AmS) and hydroxylammonium sulfate (HAS) were determined by titration. Reaction yields were calculated using analytical results obtained for HA, AmS and HAS as shown in Tables 6 and 7 for 5 runs. Results of this example show that again a yield of 90% and higher can be achieved by neutralizing hydroxylamine sulfate with a weak base such as ammonia and the solubility of the ammonium sulfate side product can be controlled to less than 5% in the hydroxylamine product solution after filtration. In addition, an HA solution of greater than (>) 50% by weight can be prepared in one neutralization step after the removal of the excess ammonia and the dissolved ammonium sulfate.

TABLE 4

Results of analysis on products from Example 5

| Test # | Ammonia water (g) | Ammonia conc. (wt %) | HAS crystal (g) | $NH_3$ added (g) | Filtrate (g) | HA (wt %) | $NH_3$ (wt %) | HAS (wt %) | AmS (wt %) |
|---|---|---|---|---|---|---|---|---|---|
| 1 | 397 | 18.6 | 461 | 268 | 544 | 26.51 | 16.29 | 0.163 | 5.60 |
| 2 | 399 | 18.6 | 465 | 293 | 555 | 27.13 | 20.13 | 0 | 2.54 |
| 3 | 400 | 21.0 | 481 | 250 | 459 | 30.42 | 17.62 | 0 | 5.68 |
| 4 | 429 | 18.6 | 482 | 205 | 545 | 27.56 | 18.70 | 0 | 6.03 |

TABLE 5

Results of analysis on products from Example 5 (continued)

| Test # | Filter cake (g) | Dried filter cake (g) | HAS (g) | AmS (g) | Yield based on HA (%) | Yield based on AmS (%) | Yield based on HAS (%) |
|---|---|---|---|---|---|---|---|
| 1 | 506 | 340 | 24.34 | 335.85 | 82.42 | 98.71 | 94.53 |
| 2 | 498 | 399 | 17.99 | 326.38 | 91.29 | 90.96 | 96.13 |
| 3 | 558 | 348 | 45.09 | 304.53 | 84.62 | 85.37 | 90.63 |
| 4 | 499 | 359 | 31.16 | 315.68 | 86.25 | 91.72 | 93.40 |

TABLE 6

Results of analysis on products from Example 6

| Test # | Ammonia water (g) | Ammonia conc. (wt %) | HAS crystal (g) | NH₃ added (g) | Filtrate (g) | HA (wt %) | NH₃ (wt %) | HAS (wt %) | AmS (wt %) |
|---|---|---|---|---|---|---|---|---|---|
| 1 | 406 | 29.3 | 750 | 308 | 557 | 38.80 | 19.99 | 0 | 4.94 |
| 2 | 405 | 29.3 | 761 | 327 | 491 | 37.50 | 20.60 | 0 | 3.88 |
| 3 | 413 | 29.3 | 760 | 292 | 553 | 38.36 | 19.61 | 0 | 4.38 |
| 4 | 421 | 29.3 | 762 | 304 | 525 | 37.51 | 17.86 | 0.61 | 2.20 |

TABLE 7

Results of analysis on products from Example 6 (continued)

| Test # | Filter cake (g) | Dried filter cake (g) | HAS (g) | AmS (g) | Yield based on HA (%) | Yield based on AmS (%) | Yield based on HAS (%) |
|---|---|---|---|---|---|---|---|
| 1 | 820 | 578 | 52.59 | 524.01 | 87.08 | 91.35 | 92.99 |
| 2 | 885 | 640 | 88.32 | 477.18 | 73.38 | 81.00 | 88.39 |
| 3 | 828 | 614 | 71.06 | 502.23 | 83.47 | 86.04 | 90.65 |
| 4 | 865 | 632 | 52.59 | 524.01 | 79.28 | 87.30 | 92.68 |

EXAMPLE 7 (INVENTION)

300 mL of product mixture solutions prepared in Example 3 were treated with 160 mL of ion-exchange resins. 80 mL each from Rohm and Haas Amberjet 4400 and Mitsubishi SAT 20L sequentially. This was repeated again and then treated with 80 mL of Rohm and Haas Amberjet 1500 and 160 mL of Mitsubishi SKT 20L. The resulting solution from the ion-exchange process was analyzed along with the solution after filtration for metal impurities with an ICP-MS [inductive coupled plasma—mass spectrometry] instrument. Results of the metal analysis are shown in Table 8 along with those of an "18 Megohm" water.

TABLE 8

Results of ICP-MS analysis on the product from Example 5

| Metals | 18 Megohm water | Filtered HA product | Ion-exchanged sample |
|---|---|---|---|
| Na (ppb) | 0.077 | 136.4 | 3.54 |
| Co (ppb) | 0.045 | 2.22 | 0.094 |
| Ni (ppb) | 0.43 | 29.73 | 0.52 |
| Cu (ppb) | 0.11 | 1.43 | 0.72 |
| Fe (ppb) | 0.23 | 619.2 | 4.99 |

EXAMPLE 8 (INVENTION)

Following a general procedure of Example 7, the ion-exchange process was followed with the product pH measurement and titration analysis. 300 mL of HA product from Example 3 were treated with Rohm and Haas ion-exchange resins: Amberjet 4400 and Amberjet 1500 ["R&H"] sequentially. Analytical results on the ion-exchanged products are summarized in Table 9.

TABLE 9

Results of titration analysis on products from Example 5

| Sample number | Total R&H 4400 (mL) | Total R&H 1500 (mL) | pH | HAS (wt %) | (NH₄)₂SO₄ (wt %) | NH₃ (wt %) | HA (wt %) |
|---|---|---|---|---|---|---|---|
| 1 | 80 | 80 | 8.95 | 0 | 9.71 | 2.88 | 10.72 |
| 2 | 240 | 80 | 9.09 | 0 | 4.35 | 2.16 | 9.65 |
| 3 | 240 | 160 | 9.11 | 0 | 4.21 | 1.22 | 8.39 |
| 4 | 320 | 160 | 9.06 | 0 | 1.94 | 1.53 | 7.58 |

EXAMPLE 9 (INVENTION)

300 mL of the ion-exchanged hydroxylamine solution from Run number 1 of Example 4 were distilled under vacuum (200 torrs to 8 torrs, or 26.6 kPa to 1.1 kPa) at 35° C. for 80 minutes in a rotary evaporator. The resulting distillation bottom was analyzed with an automatic titrator. Results are shown in Table 8 along with that of the starting solution.

TABLE 10

Results of titration analysis on products from Example 8

| Sample | pH | HAS (wt %) | (NH₄)₂SO₄ (wt %) | NH₃ (wt %) | HA (wt %) |
|---|---|---|---|---|---|
| Starting feed | 8.97 | 0 | 8.83 | 3.60 | 10.36 |
| Mother liquor | 6.64 | 28.93 | 15.54 | 0 | 36.01 |

These results show that during the vacuum distillation NH3 was completely removed. With a pH of 6, the reversion of ammonium sulfate to hydroxylamine sulfate occurred.

All the examples are intended for illustration purpose only. Those skilled in the art will readily recognize and appreciate that many modifications and variations can be made and such modifications and variations are encompassed within the scope and spirit of the present invention as defined by the written disclosure and the accompanying claims.

What we claim is:

1. A process for preparing a high purity and high concentration hydroxylamine product, the process comprises
    a. feeding an aqueous feed solution containing a hydroxylammonium salt at a maximum concentration and a stabilizer into a reactor at a low temperature;
    b. neutralizing the aqueous feed solution with a base to form a slurry until the pH of the resulting slurry reaches in a range of from about 9.0 to about 12.0;
    c. adding an additional amount of solid of the hydroxylammonium salt to increase the total amount of the hydroxylammonium salt in the reactor before or during neutralization of step b;
    d. separating the resulting slurry into an aqueous solution phase and a solid phase at a temperature between about −20° C. to about 20° C.;
    e. treating the aqueous solution phase in at least one ion exchange column containing at least one ion exchange resin to produce a high purity hydroxylamine solution thereby the resistivity is not lower than about 10 Megohms-cm; and
    f. concentrating the high purity hydroxylamine solution at a sub-atmospheric pressure to form the high purity and high concentration hydroxylamine product.

2. The process of claim 1, wherein the hydroxylammonium salt is a salt of a mineral acid selected from the group consisting of hydroxylammonium sulfate, hydroxylammonium nitrate, hydroxylammonium chloride and mixtures thereof.

3. The process of claim 2, wherein the hydroxylammonium salt consists essentially of hydroxylammonium sulfate.

4. The process of claim 1, wherein the base is selected from a strong base or a weak base, wherein the strong base is selected from sodium hydroxide, potassium hydroxide and mixtures thereof; and the weak base is selected from ammonia, ammonium hydroxide, volatile alkylamines, cyclic amines and mixtures thereof.

5. The process of claim 4, wherein the base is ammonia.

6. The process of claim 1, wherein the stabilizer is a compound selected from the group consisting of hydroxyanthraquinone, substituted hydroxyanthraquinones, thiourea, substituted thioureas, hydroxyurea, substituted hydroxyureas, aminoquinoline, substituted aminoquinolines, phenanthroline, substituted phenanthrolines, one or more polyhydroxyphenols, cyclohexanediaminetetraacetic acid, thiamine or its derivatives, ethylenediaminetetraacetic acid or its derivatives, and mixtures thereof.

7. The process of claim 6, wherein the stabilizer consists essentially of cyclohexanediaminetetraacetic acid.

8. The process of claim 1, wherein the neutralization is conducted at a temperature in the range of from about 5° C. to about 65° C.

9. The process of claim 1, wherein the neutralization is conducted at a temperature in the range of from about 10° C. to about 55° C.

10. The process of claim 1, wherein the neutralization is conducted at a temperature in the range of from about 15° C. to about 45° C.

11. The process of claim 1, wherein the hydroxylammonium salt consists essentially of hydroxylammonium sulfate and the ratio of the additional amount of the solid added to the amount of hydroxylammonium sulfate in the aqueous feeding solution is in the range of from about 0 to about 4.8 on a weight to weight basis.

12. The process of claim 11, wherein the ratio is in the range of from about 0.5 to about 4.6.

13. The process of claim 11, wherein the ratio is in the range of from about 0.6 to about 4.5.

14. The process of claim 1, wherein separation in step d is conducted by centrifugation, filtration, or combination thereof.

15. The process of claim 14, wherein the temperature of step d is between about −10° C. to about 15° C.

16. The process of claim 14, wherein the temperature of step d is between about 5° C. to about 15° C.

17. The process of claim 1, wherein the base is ammonia, the hydroxylammonium salt consists essentially of hydroxylammonium sulfate, and the aqueous solution phase contains greater than 50% of hydroxylamine after removal of ammonium sulfate and residual ammonia.

18. The process of claim 1, wherein the ion-exchange resin is selected from the group consisting of cation-exchange resin, anion-exchange resin, and mixtures thereof thereby ammonium cation and anions of mineral acids are removed.

19. The process of claim 18, wherein the anion exchange resin is selected from one or more strong base gel resins, one or more macroporous resins, or mixtures thereof.

20. The process of claim 18, wherein the cation exchange resin is selected from one or more strong acid gel resins, one or more macroporous resins, or mixtures thereof.

21. The process of claim 18, wherein the ion exchange process is carried out in four stages:
    A. feeding the aqueous solution phase into a first column containing the anion exchange resin until breakthrough of salt anions in the effluent;
    B. regenerating the anion exchange resin with sulfuric acid to form a sulfate form followed by converting the sulfate form into an hydroxide form;
    C. feeding the effluent from stage A into a second column containing the cation exchange resin until breakthrough of ammonium ion; and
    D. regenerating the cation exchange resin with sulfuric acid.

22. The process of claim 1, wherein the process is carried out in a continuous moving bed or simulated moving bed ion exchange apparatus.

23. The process of claim 1, wherein the concentration step f is conducted under the sub-atmospheric pressure in the range of from about 6 torrs to about 100 torrs [about 0.8 kPa to about 13.3 kPa].

24. The process of claim 1, wherein the sub-atmospheric pressure in the range of from about 10 torrs to about 80 torrs [about 1.33 kPa to about 10.7 kPa].

25. The process of claim 1, wherein the sub-atmospheric pressure in the range of from about 10 torrs to about 60 torrs [about 1.33 kPa to about 8.0 kPa].

26. The process of claim 1, wherein the temperature for the concentration step f is in the range of from about 25° C. to about 60° C.

27. The process of claim 1, wherein the temperature for the concentration step f is in the range of from about 30° C. to about 50° C.

28. The process of claim 1, wherein the temperature for the concentration step f is in the range of from about 35° C. to about 45° C.

29. The process of claim 1, wherein temperature change during neutralization step b is maintained within a range of from about 0 to about 25° C.

30. A process for preparing a high purity and high concentration hydroxylamine product, the process comprises:
   a. feeding an aqueous feed solution containing a hydroxylammonium salt consisting essentially of hydroxylammonium sulfate at a maximum concentration and a stabilizer consisting essentially of cyclohexanediaminetetraacetic acid into a reactor at a low temperature;
   b. neutralizing the aqueous feed solution at a temperature in the range of from about 15° C. to 45° C. with a base to form a slurry until the pH of the resulting slurry reaches in a range of from about 9.0 to about 12.0;
   c. adding an additional amount of solid of hydroxylammonium sulfate wherein the ratio of the additional amount of solid added to the amount of hydroxylammonium sulfate in the aqueous feeding solution is in the range of from 0.6 to 4.5 on a weight to weight basis to increase the total amount of hydroxylammonium sulfate in the reactor before or during neutralization of step b;
   d. separating the resulting slurry by centrifugation and filtration into an aqueous solution phase and a solid phase at a temperature between about 5° C. to about 15° C.;
   e. treating the aqueous solution phase in a first column containing anion exchange resin to form an effluent followed by treating the effluent from the first column in a second column containing a cation exchange resin to produce a high purity hydroxylamine solution thereby the resistivity is in the range of from about 10 Megohms-cm to about 50 Megohms-cm; and
   f. concentrating the high purity hydroxylamine solution at a sub-atmospheric pressure in the range of from about 10 torrs to about 60 torrs [about 1.33 kPa to about 8.0 kPa] and a temperature in the range of from about 35° C. to about 45° C. to form the high purity and high concentration hydroxylamine product.

31. The process of claim 30, wherein the aqueous solution phase contains greater than 50% of hydroxylamine after removal of ammonium sulfate and residual ammonia.

* * * * *